May 1, 1945.  J. SNEED  2,374,901
GEAR FORMING MACHINE
Filed Jan. 21, 1941  4 Sheets-Sheet 3
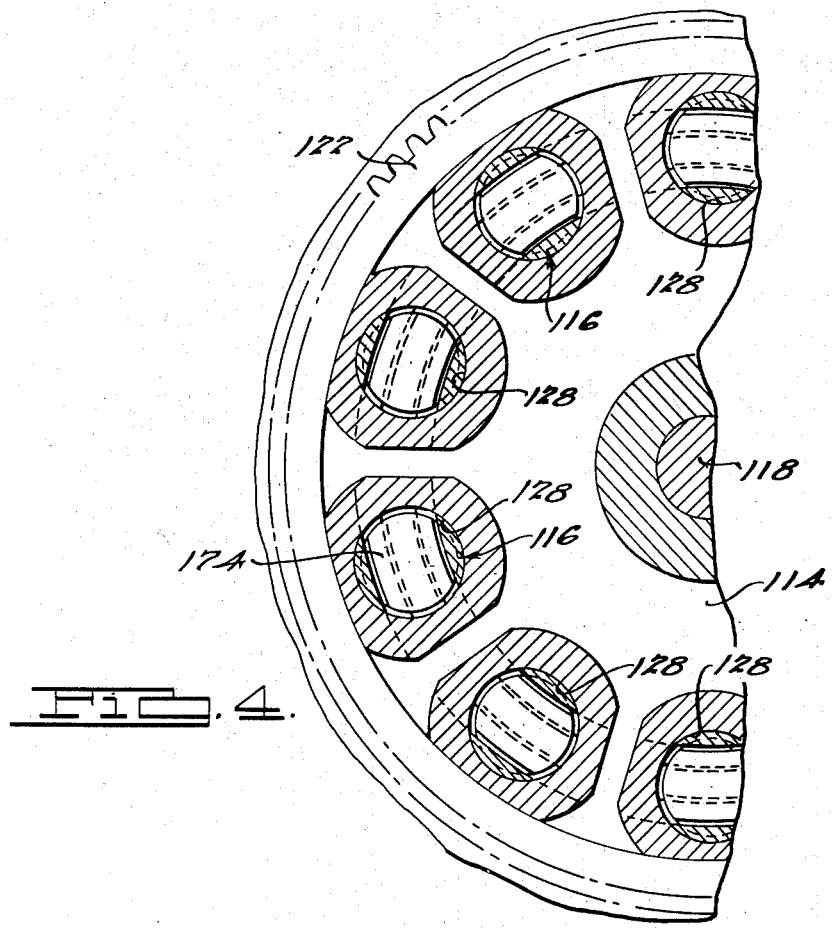
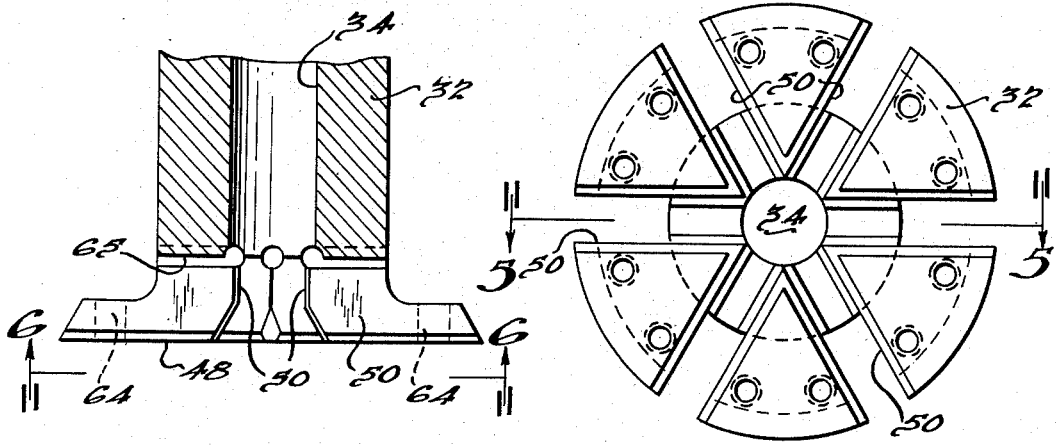
INVENTOR
John Sneed.
BY
Harness, Dickey & Pierce.
ATTORNEYS.

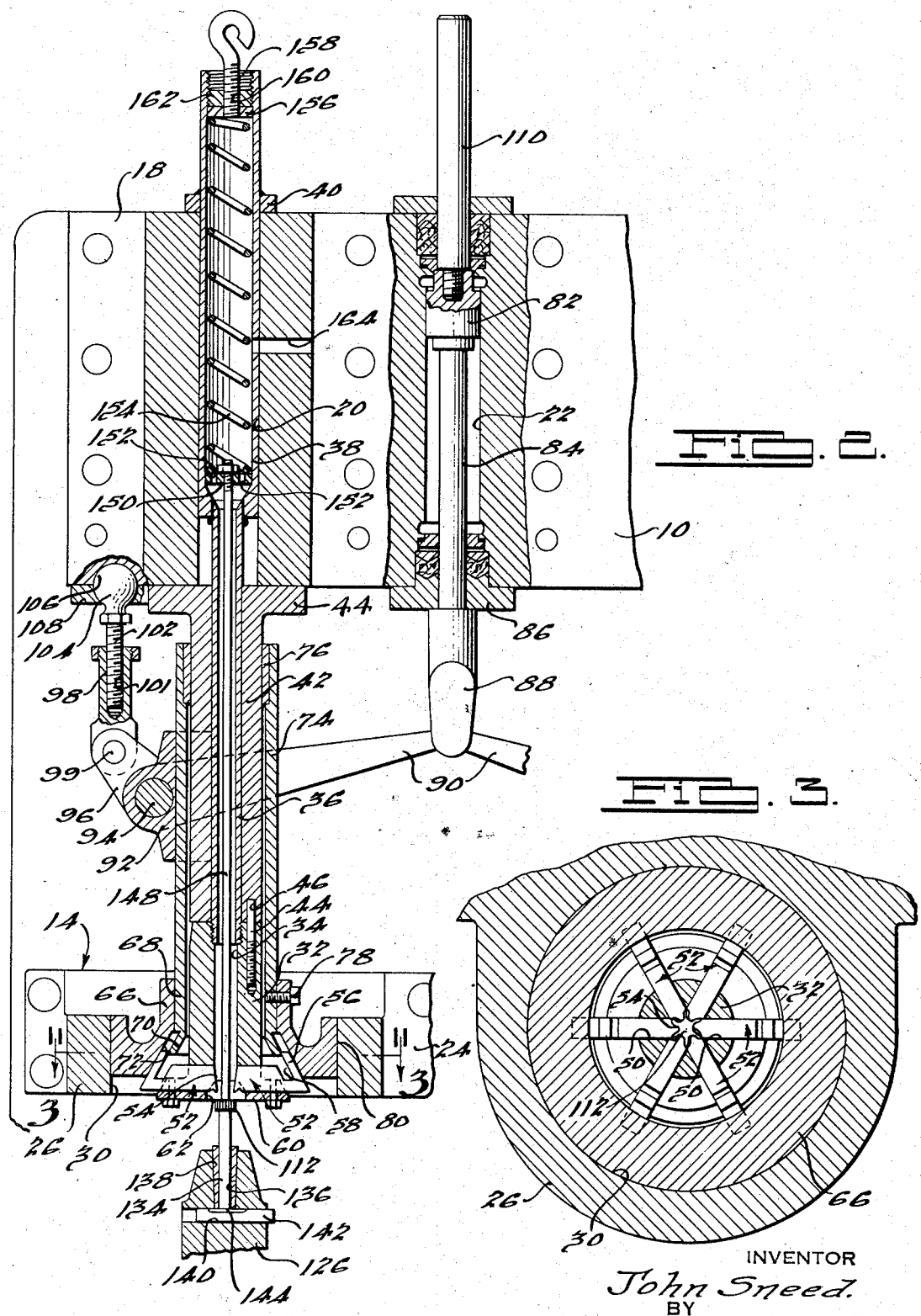

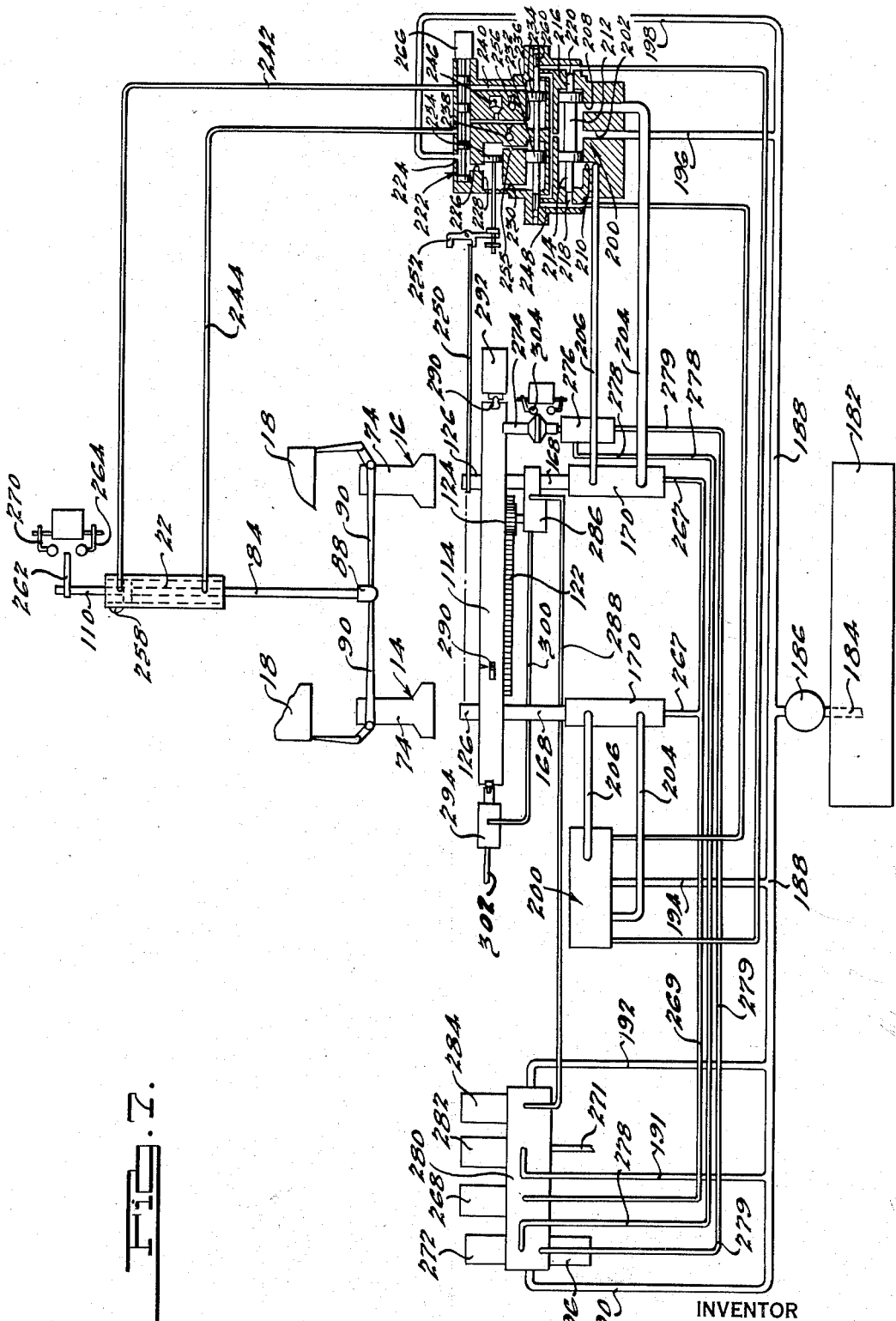

Patented May 1, 1945

2,374,901

UNITED STATES PATENT OFFICE 2,374,901

GEAR FORMING MACHINE

John Sneed, Huntington Woods, Mich., assignor, by mesne assignments, to Michigan Tool Company, Detroit, Mich., a corporation of Delaware Application January 21, 1941, Serial No. 375,116

5 Claims. (Cl. 90—10)

The present invention relates to machines for forming machine elements, such as gears.

One of the primary objects of the present invention is to provide improved machines of the type mentioned, in which all of the teeth of a gear may be simultaneously formed on a gear blank, thereby greatly increasing the speed of production of the gear.

Another object of the invention is to provide an improved machine of the type mentioned, on which the various operating elements are hydraulically actuated in an improved manner.

Another object of the invention is to provide an improved machine of the type mentioned, in which a plurality of cutting stations are provided and in which the machine elements are moved from station to station in predetermined relationship and are operated at such stations to accomplish the cutting operations in an improved manner.

Another object of the invention is to provide an improved cutter head assembly for use on machines of the type mentioned, whereby a plurality of the circumferentially disposed cutters may be positively and accurately fed radially with respect to the gear blank to quickly form all of the gear teeth simultaneously.

A further object of the invention is to provide an improved cutter head construction in which cutters may be mounted thereon in an improved manner.

Another object of the invention is to provide a construction whereby all of the teeth of a helical gear may be simultaneously formed in an improved manner.

Another object of the invention is to provide an improved construction, in which a plurality of circumferentially displaced, radially disposed cutters and a work holder having a gear blank mounted thereon are reciprocated with respect to each other, and in which one of the reciprocating elements is guided on the helix of the teeth to be cut.

Another object of the invention is to provide an improved means for feeding the cutters radially inwardly and outwardly to a predetermined adjustable extent in machines of the type above mentioned.

Another object of the invention is to provide an improved means for feeding the cutters radially inwardly and outwardly in a machine in which a plurality of cutting stations are provided and by which the extent of in and out feed may be independently adjusted at each of the stations.

Another object of the invention is to provide an improved construction, in which a work holder and a gear blank mounted thereon are reciprocated with respect to a plurality of circumferentially displaced, radially disposed cutters, and in which the work holder is guided on the helix of the teeth to be cut with hydraulically actuated means releasably connected to the work holder and guided so that such releasable connection is aligned with the work holder.

A further object of the invention is to provide an improved machine of the type mentioned, which includes a plurality of cutting stations, in which work holders are moved from one station to another and in which an automatically releasable connection is provided between power means at each of the stations with the holder as the holders are brought into position with respect to the stations.

Other objects of the invention will become apparent in the following specification, the drawings relating thereto, and from the claims hereinafter set forth.

In the drawings, in which like numerals are used to designate like parts throughout:

Fig. 2 is an enlarged vertical cross-sectional view of parts in elevation of a portion of the construction shown in Fig. 1;

Fig. 3 is a cross-sectional view taken substantially along the line 3—3 of Fig. 2;

Fig. 4 is an enlarged cross-sectional view taken substantially along the line 4—4 of Fig. 1;

Fig. 5 is a fragmentary vertical cross-sectional view of the illustrative cutter head construction and taken substantially along the line 5—5 of Fig. 6;

Fig. 6 is a bottom plan view taken along the line 6—6 of Fig. 5; and

Fig. 7 is a diagrammatical view, with parts in cross section, illustrating the hydraulic circuit in its association with the various operating elements.

Figure 1:
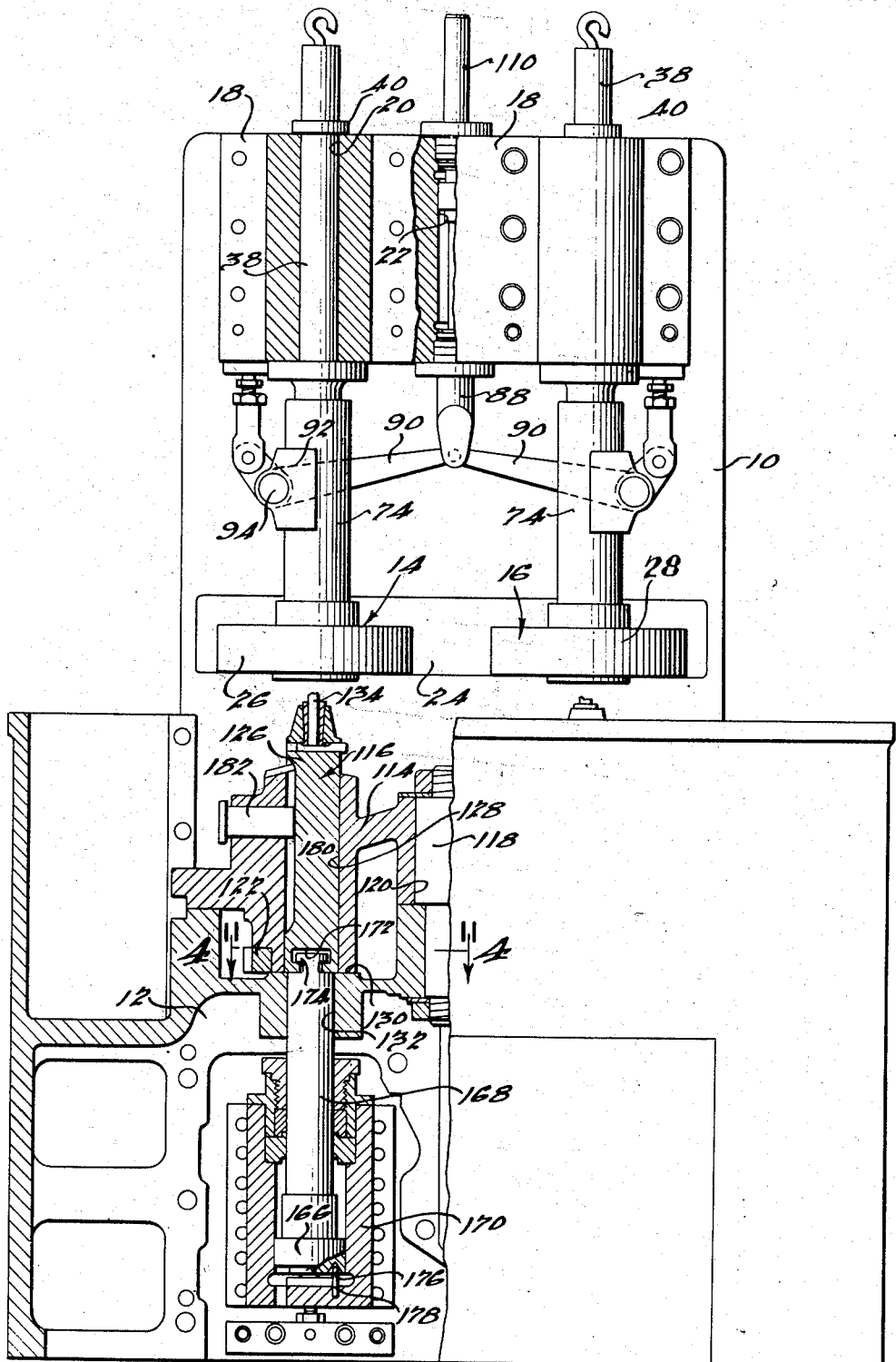
Figure 1 is a front elevational view with parts broken away, illustrating parts in cross-section of a gear forming machine embodying features of the present invention.

According to the present invention, a construction is provided which includes a plurality of cutting stations mounted upon a standard and in which each of the said cutting stations includes a plurality of circumferentially spaced, radially disposed cutters, which are mounted on a cutter head in surrounding relationship to a gear blank. A plurality of holding means for the gear blanks are provided adjacent the cutting stations, so that such holders are brought into alignment with the cutting stations. The holders are mounted for reciprocation with respect to the cutting stations and are so constructed and arranged with respect to a stationary power means at each of the stations, that the power means are releasably connected to the holders, so that such holders are brought into alignment with the power means at each station to reciprocate the holders with respect to the cutter. Upon reciprocation of the holders, the gear blank is moved into cutting engagement with the cutters. The cutters are alternately fed radially inwardly and are backed off during the upward and downward strokes of the gear blank, so that as the cutters are fed inwardly all of the teeth are cut simultaneously. The cutters may be of such a shape that in the completed operation they remove entirely the interdental stock of the teeth formed thereby. One of the cutting stations may be a rough cutting station and the other a finishing station, or both stations may be such as to completely form the gear teeth.

A particular embodiment illustrated is a machine for cutting helical gears and, in order to accomplish this, the holders for the gear blanks are mounted for rotation about their axis and guide means are provided so that upon reciprocation of the holder the gear blanks are caused to follow a helical path, which is on the helix of the gear to be cut.

The cutter elements per se, which may be used with the machines of the present invention, are disclosed and claimed in copending application of John Sneed, Serial No. 375,115, filed January 21, 1941, now Patent No. 2,348,759, issued May 16, 1944.

Referring to the drawings, the machine comprises a standard including an upright portion 10 and a base portion 12. A plurality of cutting stations, generally indicated at 14 and 16, are mounted on the upright 10, together with the operating means therefor. Such stations are substantially identical with each other, so that a detailed description of one will be sufficient for both.

A cutter head stock and feed cylinder member 18 is mounted on the forward face of the upright portion 10 of the standard and projects toward one side thereof. Such member may be suitably fixed to the upright member 10 as by bolts. Such member 18 includes a pair of vertically disposed, parallel, cylindrical bores 20, there being one such bore for each of the cutting stations 14 and 16. A central feed cylinder 22 is formed midway between the bores 20 and is substantially parallel thereto.

A head guide member 24 is also bolted to the forward face of the upright 10 and projects from the same side as the member 18. The member 24 is provided with bosses 26 and 28 for the cutting stations 14 and 16, respectively. The bosses 26 and 28 are provided with vertically extending cylindrical bores 30 therethrough. which are co-axial with their respective bores 20 formed in the cutter head stock member 18.

Each of the cutting stations 14 and 16 includes a cutter head 32 which is disposed within the bore 30 co-axially thereof, as best shown in Fig. 2. The cutter head 32 is provided with a central bore 34 and is co-axially mounted within the bore 30 by means of a depending tubular member 36. the lower end of which is threaded into a tapped opening in the top of member 32. The tubular member 36 extends upwardly to within the bore 20 where it is welded to another embracing tubular member 38. The tubular member 38 is disposed within the cylindrical bore 20 and extends upwardly above the head stock member 18. A collar 40 embraces the tubular member 38 and is welded thereto. Such collar bears against the top surface of the head stock member 18.

A cutter head shaft member 42 embraces the tubular member 36 and has an enlarged upper portion 44 which bears against the under surface of head stock member 18 and is bolted thereto. The lower end of the member 42 bears against the top surface of cutter head 32 so that upward thrust against the cutter head 32 is transmitted to the head stock member 18 through member 42, and cutter head 32 is thereby fixed against any upward movement. A pin 44 is threaded into a tapped opening formed through the upper surface of the cutter head 32 and projects upwardly therebeyond. The projecting end of pin 44 is received within an aligned opening 46 formed in the bottom of member 42 so that the cutter head 32 is fixed against rotation.

The details of the cutter head 32 are best shown in Figs. 5 and 6; and such cutter head includes an enlarged, annular bottom portion formed with a flat under side 48. A plurality of radially extending slots 50 are formed in the bottom of the member 32, through the enlarged portion and through a part of the axially extending portion so that such slots 50 are open through the bottom of the cutter head. The slots are circumferentially spaced about the axis of bore 34 and are adapted to slidably receive therein, for radial movement only, the gear cutters generally indicated at 52. The number of such slots 50, with a corresponding number of gear cutters 52, depends upon the number of teeth in the gear to be cut and, in the present embodiment, six of such slots and gear cutters are provided.

As mentioned above, the gear cutters 52 are disclosed in detail and claimed in the above-mentioned copending application of John Sneed; and such gear cutters include a body portion which is elongated in form and which is rectangular in transverse section, having a cutting portion 54 formed along the inner edge thereof. In the embodiment here illustrated, the machine is intended to cut helical gears so that the cutting portions 54 are disposed at an acute angle, which is the helix angle of the gear to be cut, to the axis of the bore 34, which is co-axial with the axis of reciprocation of the gear blank, which will be described in detail hereinafter. The cutting edge has a leading cutting face formed thereon which is formed substantially flat and which is at an angle of greater than 90° with the axis of the work and which is at an angle of substantially 90° to the helix in one plane at any position it is formed along the length of the edge. The outer portions of the gear cutters 52 are formed with upwardly and inwardly tapering tail portions 56 which form recesses 58 parallel with the outer end edge of the tail portions. The angle of the outer and inner walls of the tail portions 56 is predetermined according to the desired extent of radial infeed and outfeed of the cutters.

The cutters are free to slide radially with respect to the cutter head 32 but are fixed against axial displacement with respect thereto by means of a bottom plate 60 having a central opening 62 therethrough which is bolted to the bottom side of the cutter head 32 through a plurality of circumferentially spaced openings 64 provided in the enlarged bottom of such cutter head. The top edges of the cutters slidably bear against the tops 65 of the radial grooves 50.

The means for feeding the cutters 52 radially inwardly in increments and backing such cutters off so that the cutters are moved inwardly a greater extent in increments than they are backed off to form the completed gear tooth, includes a pair of members 66 and 68. The member 68 is formed with a lower cone portion 70 adjacent the bottom thereof in which the cone has substantially the same slope as the inner wall of tail 56. The member 66 is formed with an inner cone surface 72 which is parallel to the conical surface 70 and spaced therefrom to slidably receive therein the tail portions 56, so that the conical surface 72 slidably bears against the outer surface of tails 56 and the conical surface 70 slidably bears against the inner surface of tails 56. The member 68 has an upwardly extending tubular portion 74 which embraces the cutter head 32 and the member 42; and a bearing sleeve 76 is fixed to the upper end of member 74 and slidably bears against the member 42 so that the member 68 may be moved axially with respect to the cutter head 32.

The outer member 66 has an annular portion which embraces and bears against the member 68 and is fixed thereto by means of suitable bolts 78. The outer surface 80 of member 66 is cylindrical in form and is slidably received within the bearing bore 30 so that the member 66 and the member 68 are guided and maintained in axial alignment as they are reciprocated.

It will be evident that as the members 66 and 68 are moved downwardly, the cutters 52 are moved radially inwardly due to the bearing of the conical surface 72 against the outer surface of tails 56; and, when the members 66 and 68 are moved upwardly, the cutters are backed off or moved radially outwardly due to the engagement of the outer conical surface 70 with the inner surface of tails 56.

The means for reciprocating the member 74, and, therefore, the means for controlling the in and out feed of the cutters, include a feed piston 82 slidably disposed within bore 22 of the feed cylinder. The piston 82 has a depending piston rod 84 which extends through a sealed opening formed in an end cap member 86. The lower end of the piston rod 84 is rigidly connected to a depending extension 88 which is pivotally connected to the ends of oppositely extending operating links 90. One of such links extends to the operating mechanism for cutting station 14 and the other link extends to the operating mechanism for station 16.

The opposite end of each of the members 90 is pivotally connected to a member 92 through pivot pin 94. The member 92 partially embraces the member 74 and is suitably fixed thereto as by welding. Another link member 96 has one end pivotally mounted on the pivot pin 94 and has the other end pivotally connected to a depending adjustable link 98 by means of a pivot pin 99. The adjustable link 98 includes a portion pivotally connected to the pin 99 and provided with a tapped opening 101 therethrough. A threaded member 102 is adjustably received within the tapped opening 101 and is provided with an integral upper ball member 104. The ball member 104 is mounted within a ball recess 106 formed in the underside of member 18, together with a plate member 108 which provides a portion of the ball recess and which is attached to the underside of member 18.

It will thus be seen that as the piston 82 is reciprocated, the member 74 is caused to move down and up under the control of the linkage connection 90, 96, and 98. By adjusting the length of the link 98, it will be appreciated that the extent of such feed for predetermined movements of piston 82 may be adjustably varied. The adjustment may be such that relatively deep cuts are made during the initial cutting strokes with shallow cuts during the cutting strokes at the final stages. It will also be appreciated that the link 98 may be independently adjusted at each of the stations so that the feed at each of the stations may be adjustably varied.

As stated above, the feed of the cutter inwardly is in increments and the cutters are alternately fed inwardly and backed off. For each succeeding increment, the cutters are fed inwardly a greater distance than they are backed off so that for one complete cycle, the entire gear tooth is formed.

In order to provide for the greater extent of infeed than backoff, the piston 82 is hydraulically actuated so that uniform volumes of actuating fluid are introduced into opposite ends of the cylinder 22, in a manner which will be pointed out in detail hereinafter. An upwardly extending rod member 110 is fixed to the top of piston 82 coaxially therewith and projects upwardly through a sealed opening formed in the feed cylinder portion of member 18. The rod 110 is of greater cross-sectional area than the rod 84 so that when fluid is introduced into the upper end of the feed cylinder bore 22, to move the member 74 downwardly and to feed the cutters radially inwardly, the piston 82 is displaced downwardly a greater extent than when fluid is introduced into the bottom of the cylinder 22 to force the piston 82 upwardly, to back-off the cutters.

The hydraulic circuit for accomplishing this operation will be described in detail hereinafter, together with its association with the other operating parts of the machine.

The gear blanks from which the gears are formed are indicated at 112 and are mounted upon a rotatable table 114 which supports a plurality of work holders, generally indicated at 116, at circumferentially spaced intervals thereon. The table is mounted on the lower portion 12 of standard 10 for rotation with respect thereto by means of a central shaft 118 which is received through an axial, vertical bore 120 in the table 114. The holders are moved from station to station and the means for moving such holders includes a ring gear 122 which is fixed to table 114 and which meshes with a pinion 124 (Fig. 7) in a manner which will be pointed out in detail hereinafter.

Each of the gear holders 116 includes a ram 126 which is reciprocably and rotatably mounted within a vertically extending, cylindrical bore 128 formed in table 114. The table 114 rotatably bears against a finished, annular, horizontal surface 130 formed in standard portion 12, and such standard portion 12 is formed with a pair of vertically extending bores 132 which are coaxially aligned with the longitudinal axes of cutting stations 14 and 16. As the table 114 is rotated, the bottoms of the rams 126 bear against the finished surface 130 so that the bottoms of rams 126 pass over bores 132 and are of greater area than such bores so that they are maintained in their position within bores 128.

The gear blanks 112 are mounted on the upper ends of rams 126 by means of arbors 134 which are received within upwardly extending vertical openings 136 formed in the upper ends of each ram 126 and secured therein by means of a longitudinally split, wedge shaped sleeve 138 which is driven into such opening 136 and bears against the arbor 134 to secure such arbor to the holder. A transversely extending opening 140 is provided adjacent the upper end of the ram 126 and communicates with the opening 136. A key 142 is slidably received within the opening 140 and is provided with a recess 144 which is tapered toward one end and which receives the lower end of arbor 134. It will thus be seen that when the member 142 is driven in one direction, the arbor 134 is knocked upwardly out of its fixed position with respect to the ram.

The upper end of the arbor 134 is provided with a reduced, upwardly extending and coaxial projection which is complementary in shape to the central opening through the gear blank for supporting the gear blank thereon.

A depending rod member 148 is received through bore 134 and through the bore of tubular member 36 and extends upwardly to within the tubular member 38. The upper end of the rod member 148 is fixed to a disc member 150 which is slidably received within the bore of tubular member 38 and which is provided with a plurality of apertures 152 therethrough. The disc member 150, together with the rod member 148, is resiliently urged downwardly by means of a spiral spring 154 which is positioned within member 38, and the lower end of which engages the top surface of disc 150. The upper end of the spiral spring 154 bears against the under surface of a disc member 156 which is fixed to the lower end of a threaded hook 158. The threaded hook 158 is threadably received within a tapped opening 160 of an end member 162 which is threaded into the upper end of member 38.

The lower end of member 148 extends below the cutters 52 and bears against the top surface of gear blank 112 when such gear blank is at the cutting stations so that the gear blank is resiliently held against the arbor during its reciprocation.

A port 164 is provided in the member 18 and communicates through an aligned opening in member 38 with the interior thereof for the introduction of a cutting fluid. A suitable source is provided for supplying cutting fluid through opening 164 and such fluid passes downwardly through openings 152 and through the space between member 148 and the inner walls of member 36 and the bore 34 so that such cutting fluid passes over the cutters and gear blanks during the cutting operation.

At the cutting stations 14 and 16, the rams 126 are simultaneously reciprocated to bring the gear blanks into cutting engagement with the cutters 52.

The means for reciprocating the rams 126 include an hydraulically actuated reciprocating piston 166 having an integral upwardly extending piston rod or ram 168. There is one of such pistons and piston rods provided at each of the cutting stations. The pistons 166 are slidably received within work cylinders 170 located at each of the cutting stations. Ports are provided for introducing fluid under pressure to the opposite ends of each of the cylinders 170, as will be pointed out in detail hereinafter. Each of the piston rods 168 extends through a sealed opening formed in the upper end of its cylinder 170 and the upper end of the piston rod is slidably received and guided within the cylindrical bore 132 which is coaxial with the axis of its cutting station.

The lower end of each of the rams 126 is formed with a T slot 172 and the upper end of each of the rams 168 is formed with a complementary T 174 which is adapted to be received within the T slot 172 of that holder 126 which has been moved to stations 14 or 16. The T slot 172 and the T 174 are maintained in proper aligned relationship with respect to each other so that as the table 114 is rotated, the particular holders which have been moved to stations 14 and 16 are automatically connected to their respective rams 168 at such stations.

Since the piston 166, together with its ram 168, is free to rotate with respect to the bore of cylinder 170, the bottom surface of cylinder 166 is provided with a conical recess 176 which is adapted to receive therein the upper end of a pin 178 which is mounted in the lower end of cylinder 170 and projects upwardly into the bore. It will thus be seen that when the piston 166 approaches its lowermost position the engagement of the pin 178 with the side walls of the conical recess 176 causes the piston 166 to be aligned and properly positioned within its bore in the event that it has moved slightly out of such alignment, so that the T 174 is in its proper position with respect to the T slot 172 for the next approaching ram 126.

As stated above, the holder 126 is free to rotate about its own axis within bore 128, as well as to reciprocate therein. The holder 126, together with the gear blank, is thus guided to follow a predetermined path during reciprocation. In order to so guide the ram, a longitudinally extending recess 180 is formed in one side of the ram and is adapted to receive therein a follower pin 182 which is mounted on table 114 adjacent its ram. Such guide recess 180 is formed on the helix of the gear to be cut so that the gear blank follows a path on the helix of the gear to be cut as it is reciprocated. When spur gears are being formed, the helix angle is of course zero so that such groove 180 may be vertical. When the helix angle is other than zero, the groove 180 is formed on a corresponding helix.

In general, in the operation of the apparatus above described, the gear blanks 112 are mounted upon arbors 134 and the table 114 is rotated so that such gear blanks are brought into alignment with the cutting stations and into alignment with the reciprocating rams 168. In the reciprocation of the rams 168, the gear blanks are moved upwardly into cutting engagement with gear cutters 52 so that cuts for all of the gear teeth are taken simultaneously. When the gear blanks 112, together with the rams 164, have reached the upper end of their strokes, the movement of piston 82 is so timed that the gear cutters are backed off so that upon downward movement of the ram 168, the gear blank does not engage the cutters. Before the gear blanks are again brought into cutting engagement with the cutters, the piston 82 is moved downwardly an incremental amount greater than the preceding backoff amount, so that the gear cutters are moved radially inwardly to take the next cut. After the completion of the gears at the stations, the table is indexed to bring the next gear blank into alignment with the cutting stations.

The above described operating elements are hydraulically actuated and in Fig. 7 the hydraulic circuit for effecting such operations is diagrammatically illustrated, together with other operating elements, such as the table indexing and locking mechanism. As stated, the elements are merely shown diagrammatically but the working constructions thereof will be readily understood by those skilled in the art.

Referring to such figure, the circuit includes an oil supply tank 182 having a supply line 184 which communicates with the intake of an hydraulic pump 186. The outlet of the pump leads to a high pressure line 188 having branch lines 190, 191, 192, 194, 196, and 198 leading therefrom.

The branch lines 194 and 196 lead to four-way spool valves 200 through a central inlet port 202. The four-way valves 200 are substantially identical to each other; and, each of such valves is operatively connected to the lower and upper ends of one of the work cylinders 170 through lines 204 and 206, respectively. The lines 204 and 206 communicate with the interior of the spool valve 200 through ports 208 and 210, respectively. The spool 212 for such valves has axial projections 214 and 216 which are slidably received within co-operating end ports 218 and 220, respectively. Each of the spool valves 220 is also constructed to provide return lines to the tank from each upper end of the work cylinders 170 so that as the work cylinder is moved upwardly the fluid returns through line 206, through port 210 into the valve and out of the valve through a return line to the tank. Such construction is not shown in detail but will be readily understood by those skilled in the art as it is provided for in conventional four-way spool valves.

The high pressure line 198 leads to a control spool valve generally indicated at 222 through port 224. The spool is so constructed that in the position shown the valve 222 directs the oil pressure through passage 226, through cylinder chamber 228 and through port 230 to valve 232 at the left thereof. As the valve 232 is thus moved toward the right, the feed cylinder pump 234, which is in the form of a piston directly connected to the spool valve 232, travels in the same direction. This feed cylinder pump intakes oil at port 236 through one-way valve 238 and expels oil from the pump through passage 240 and through valve 222 into the feed end of the feed cylinder 22 through conduit 242, which communicates with the feed cylinder at the top thereof. The discharge from the feed cylinder passes through conduit 244, through valve 222 and past the relief valve 246 so that the travel of the feed piston downward moves the cutter blades a predetermined distance radially inwardly.

Upon completion of these movements, the pilot valve 232 directs the oil pressure from the chamber at the left of the reduced end of the spool 232 through passage 248 into the passage 218 of each of the four-way valve 220, moving them toward the right, in the position shown. This, in turn, directs the oil pressure to the bottoms of the work cylinders 170. The work, or the gears to be cut, is then moved upwardly into engagement with the cutters to perform the cutting operation.

When the work has cleared the cutter blades, an arm 250, which is suitably connected to the work holder 126, has been moved upwardly to a predetermined position and engages the top projection of a pivotally mounted valve operating arm 252. The lower end of such operating arm is thus pivoted to shift the valve plunger 254 to the left within valve cylinder 238; and this reverses the flow of fluid through cylinder 228 so that such fluid passes through passageway 255 to the other side of the spool 232 so that such spool is shifted to the left moving with it the pump 234. The piston 234 thus draws oil from the tank through one-way valve 256, and expels the oil through port 236 and into line 244, causing the feed piston to move upwardly to back the cutter blades away from the work. The discharge from the upper end of the feed cylinder 22 passes over one-way valve 258, which is mounted on the upper end of the feed cylinder 22 and returns to the tank.

As stated above, due to the differential displacement areas within the feed cylinder, the feed cylinder is moved downwardly in increments a greater amount during each cycle than it is backed off so that as such cycles are repeated the cutters are moved radially inwardly to completely form the teeth.

When the feed valves 232 and the piston pump 234 have reached their maximum stroke, the pilot valve 260 is then directing the oil pressure to its four-way valve at 220, so that such valve is shifted toward the left. When the plunger 212 has thus been shifted toward the left, the oil then enters through conduit 206 to move the work cylinders downwardly.

When the work is cleared, the arm 250 again reverses the direction of the piston 254 through shifting mechanism 252 so that the valves are again shifted to make another cut in the work. This procedure continues until the cutting cycle is completed. At the completion of such cycle, as mentioned above, the feed piston moves downwardly and the arm 262, which is connected to the upwardly projecting member 110 of the feed piston, closes the limit switch 264. The switch 264, in turn, energizes solenoids 266 and 268, closing the control valve 222 and opening the bottom of the work cylinders 170 to the tank through conduits 267, 269 and 271, the last conduit leading back to the tank, allowing them to move to the extreme downward position.

With the control valve 222 closed, direct oil pressure from the pump moves the feed piston 22 upwardly to the extreme position, at which time the arm 262 closes limit switch 270 and opens switch 264. With the switch 270 closed, the solenoid 272 is energized, by means of relays in the electric circuit, giving pressure to the index pin 274, which is connected through a plunger mounted within index cylinder 276. Such feed is through conduits 278 or 279, which communicate with a four-way valve disposed within header 280, connected to pressure line 190, and which communicate with the upper and lower ends of cylinder 276 to pull the pin 274 downwardly or move it upwardly. With the switch set, as stated, the pin 274 is moved downwardly. Also, with the limit switch 270 closed, the solenoids 282 and 284 are energized. Such solenoids 282 and 284 are associated with four-way valves mounted within the manifold 280, which are connected with the pressure lines, so that the valve associated with solenoid 282 vents the pump through line 191 and return 271 while the table 114 is indexed or rotated.

The solenoid 284 is associated with a valve which supplies power to the indexing motor 286 which may be in the form of an hydraulic gear motor. The pinion is rotatably connected to one of the gears of the motor, so that it is rotated therewith to turn the table. Such power is supplied the motor through a conduit 288, which communicates with the pressure line 192 through the four-way valve associated with the solenoid 284.

As the table 114 revolves, one of a plurality of cams 290, which are mounted thereon at properly spaced intervals, engages the limit switch 292 and the hydraulic stop valve 294. The switch 292 energizes solenoid 296, which is connected to the opposite end of that valve with which solenoid 272 is associated, giving power to the index pin cylinder 276 at the lower end thereof through conduit 279. The stop valve 294, which is connected with the discharge end of the hydraulic motor 286 through conduit 300, restricts the discharge of oil from the index motor, and returns the oil to the tank through conduit 302, thereby retarding the forward motion of table 114 at such time as the index pin 274 engages the proper index hole formed in the underside of the table. This, in turn, holds the limit switch 292 closed by the engagement of one of the cams. After the index pin 274 is in full engagement with the table, limit switch 304 is closed by engagement with a cam projection formed on the pin 274 completing the electrical inner-lock and de-energizing solenoids 268, 282, 284 and 266. Control valve 222 is thus re-set into the position shown. On the last downward movement of the work cylinders, the arm 250 has re-set the plunger 254 into the position shown, and the machine is now ready to proceed and cut another gear or group of gears through its complete cycle.

Formal changes may be made in the specific embodiment of the invention disclosed without departing from the spirit and substance of the invention, the scope of which is commensurate with the appended claims.

What is claimed is:

1. A machine for forming simultaneously a plurality of teeth in a machine element to provide external teeth therein, comprising a reciprocatory work holder adapted to mount said element, hydraulically actuated means associated with said holder for reciprocating the same, circumferentially disposed cutters about said element for cutting engagement with said element, and hydraulically actuated means connected to said cutters for feeding said cutters radially inwardly and outwardly with respect to said element in predetermined timed relation with respect to the reciprocation of said holder, said last-named means including a differential piston motor so constructed that for the same volume of fluid introduced into opposite ends thereof the infeed is greater than the outfeed, and means for delivering the same volume of fluid to opposite ends of said differential piston motor.

2. A machine for forming simultaneously a plurality of teeth in a machine element to provide external teeth therein comprising means forming a plurality of cutting stations, each of such stations including circumferentially disposed cutters adapted to be positioned about said element for cutting engagement therewith, a rotatable support disposed adjacent said stations, a plurality of reciprocatory work holders mounted on said support and movable upon rotation of said support into axial alignment with said stations, means for reciprocating said work holders, a single, reciprocating power member, means at each station operatively connected to said cutters for feeding the cutters radially inwardly and outwardly with respect to said elements in timed relation to the reciprocation of said last-named means, means at each station operatively connecting said power member with each of said last-named means, said last-named means including means for adjusting the extent of feed of said cutters at one station independently of the extent of feed at the other station.

3. A machine for forming simultaneously a plurality of teeth in machine elements to provide external teeth therein comprising means forming a plurality of cutting stations, each of such stations including circumferentially disposed cutters adapted to be positioned about said element for cutting engagement therewith, a rotatable support disposed adjacent said stations, a plurality of reciprocatory work holders mounted on said support and movable upon rotation of said support into axial alignment with said stations, stationary reciprocating power means disposed adjacent said support in alignment with said stations for automatic releasable connection with said holders as said holders move into alignment with said stations to reciprocate said holders with respect to said cutters, a single, reciprocating power member, means at each station operatively connected to said cutters for feeding the cutters radially inwardly and outwardly with respect to said elements in timed relation to the reciprocation of said last-named means, means at each station operatively connecting said power member with each of said last-named means, said last-named means including means for adjusting the extent of feed of said cutters at one station independently of the extent of feed at the other station.

4. In a machine for forming simultaneously a plurality of teeth in a machine element to provide external teeth therein, a standard, circumferentially disposed cutters mounted on said standard about said element for cutting engagement with said element, means connected to said cutter for feeding said cutter radially, inwardly and outwardly with respect to said element, said last-named means including a reciprocable element connected to said cutters, a reciprocable power element, an operating link pivotally connected to said last-named two elements, and an adjustable link connected to said standard and to the pivotal connection between said last-named link and said first-named reciprocable element.

5. In a machine for forming simultaneously a plurality of teeth in a machine element to provide external teeth therein, a standard, circumferentially disposed cutters mounted on said standard about said element for cutting engagement with said element, means connected to said cutter for feeding said cutter radially, inwardly and outwardly with respect to said element, said last-named means including a reciprocable element connected to said cutters, an hydraulically-actuated piston motor, an operating link pivotally connected to said reciprocable element and to the piston of said motor, an adjustable link connected to said last-named link and to said reciprocable element, said motor having differential piston areas so that for the same volume of fluid introduced into opposite ends thereof the cutter infeed is greater than the cutter outfeed.

JOHN SNEED.